(12) United States Patent
Abe et al.

(10) Patent No.: US 11,173,641 B2
(45) Date of Patent: Nov. 16, 2021

(54) MOLD AND METHOD FOR MANUFACTURING MOLD

(71) Applicant: PANASONIC INTELLECTUAL PROPERTY MANAGEMENT CO., LTD., Osaka (JP)

(72) Inventors: Satoshi Abe, Osaka (JP); Kenichi Tanaka, Osaka (JP); Yoshiyuki Uchinono, Osaka (JP); Isamu Matsumoto, Osaka (JP); Masataka Takenami, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 646 days.

(21) Appl. No.: 16/065,565

(22) PCT Filed: Dec. 25, 2015

(86) PCT No.: PCT/JP2015/086590
§ 371 (c)(1),
(2) Date: Jun. 22, 2018

(87) PCT Pub. No.: WO2017/110007
PCT Pub. Date: Jun. 29, 2017

(65) Prior Publication Data
US 2021/0138708 A1    May 13, 2021

(51) Int. Cl.
*B29C 45/27* (2006.01)
*B29C 45/73* (2006.01)

(52) U.S. Cl.
CPC ...... *B29C 45/2737* (2013.01); *B29C 45/7312* (2013.01)

(58) Field of Classification Search
CPC .................. B29C 45/2737; B29C 45/2738
See application file for complete search history.

(56) References Cited

U.S. PATENT DOCUMENTS 4,955,804 A * 9/1990 Martell ............... B29C 45/2737
219/421
2006/0087050 A1 4/2006 Manda
(Continued)

FOREIGN PATENT DOCUMENTS

| CA | 1273463 A | 9/1990 |
|---|---|---|
| CN | 1044614 | 8/1990 |

(Continued)

OTHER PUBLICATIONS

Office Action issued in China Counterpart Patent Appl. No. 201580085518.2, dated Sep. 4, 2019, along with an English translation thereof.
(Continued)

*Primary Examiner* — Jacob T Minskey
*Assistant Examiner* — Virak Nguon
(74) *Attorney, Agent, or Firm* — Greenblum & Bernstein, P.L.C.

(57) ABSTRACT

There is provided a mold including a movable side mold, a fixed side mold and a sprue bush, the sprue bush including a flow path for a cooling fluid of the fixed side mold, wherein inlet and outlet ports of the flow path for the cooling fluid are in a direct connection with a cooling tube, respectively, the cooling tube being located along a space portion provided in the fixed side mold, and wherein the space portion is in a form of an opening provided in at least one of opposed surfaces of the fixed side mold.

15 Claims, 12 Drawing Sheets

(56) References Cited

U.S. PATENT DOCUMENTS

2013/0004614 A1* 1/2013 Wei .................... B29C 45/2737
　　　　　　　　　　　　　　　　　　　　　　425/567
2016/0151948 A1* 6/2016 Jenko ................. B29C 45/2737
　　　　　　　　　　　　　　　　　　　　　　425/549

FOREIGN PATENT DOCUMENTS

| CN | 1750895 | | 3/2006 |
|---|---|---|---|
| JP | 5-70922 | | 9/1993 |
| JP | 2003-245961 | | 9/2003 |
| JP | 2010-194719 | | 9/2010 |
| JP | 2014-223733 | | 12/2014 |
| JP | 2015-74185 | | 4/2015 |
| JP | 2015074185 A | * | 4/2015 |
| WO | 2004/078383 | | 9/2004 |
| WO | 2008/038694 | | 4/2008 |
| WO | 2010/082331 | | 7/2010 |

OTHER PUBLICATIONS

International Search Report issued in PCT/JP2015/086590 and Englisht translation thereof, dated Apr. 5, 2016.
English translation of the International Preliminary Report on Patentability issued in PCT/JP2015/086590, dated Jul. 5, 2018.
Extended European Search Report received in 15911439.6, dated Nov. 13, 2018.

* cited by examiner

MOLD AND METHOD FOR MANUFACTURING MOLD

TECHNICAL FIELD

The disclosure relates to a mold and a method for manufacturing the mold. More particularly, the disclosure relates to a mold for an injection molding and a method for manufacturing the mold for the injection molding.

BACKGROUND OF THE INVENTION

Techniques contributing to a growth of Japanese manufacturing industry include a molding technique by using a mold. The molding technique includes a pressure molding method, an injection molding method, an extrusion molding, and a cast molding method. The injection molding method as one of the above-molding methods is a method in which a heated and subsequent melted resin is injected into a mold, followed by being cooled and solidified to obtain a molded article. Thus, the injection molding method is suitable for performing amass production of a molded article having a complicated shape. The injection molding method is composed of the following steps: a mold clamping, an injection, a cooling and a mold opening. A repetition of the above steps allows the molded article to be continuously produced.

PATENT DOCUMENTS (RELATED ART PATENT DOCUMENTS)

PATENT DOCUMENT 1: No. WO 2008/038694
PATENT DOCUMENT 2: No. WO 2010/082331

DISCLOSURE OF THE INVENTION

Problems to be Solved by the Invention

A mold for an injection mold includes a movable side mold, a fixed side mold and a sprue bush, the sprue bush being provided in the fixed side mold. The sprue bush includes a sprue portion for injecting a melt resin into a cavity. The sprue portion may have a volume per its unit area, the sprue portion's volume being larger than that of the cavity. Thus, a taking time for solidifying the melt resin in the sprue portion may become longer than that for solidifying a melt resin in the cavity. As a result, even if a solidification of the melt resin in the cavity is forward completed, the mold opening cannot be performed until a completion of the solidification of the melt resin in the sprue portion. If the timing of performing the mold opening is earlier, the melt resin in a state of a stringiness may occur and an adequate removal of the molded article may not be performed. Therefore, a delay of the timing of performing the mold opening is necessary until the melt resin in the sprue portion is completely solidified. Therefore, the delay of the timing may result in a longer molding time for producing the molded article.

In order to shorten the time for solidifying the melt resin in the sprue portion, patent documents disclose a sprue bush having a flow path fora cooling fluid, the flow path serving to pass through the cooling fluid. In a mold including this sprue bush, each of inlet and outlet ports of the flow path for the cooling fluid of the sprue bush and a water tube for the cooling fluid are in a connection with each other via O-ring, the water tube being formed in a side surface of the fixed side mold by using a gun drill, for example (See FIG. 7). However, it is not easy to form the water tube in the side surface of the fixed side mold on a condition of the use of a special tool such as the gun drill. It is not easy to form the water tube in a condition that a mold base having a hole therein is used. If cooling media having a high temperature are used as the cooling fluid, a damage of the O ring may occur. When the water tube is formed by using the special tool such as the gun drill, a maintenance in the water tube may be difficult. Further, each of the inlet and outlet ports of the flow path for the cooling fluid and the cooling tube are not in the direct connection with each other. Thus, an accurate control of the temperature is not easy.

In order to solve the above technical problems, the present invention has been created. That is, an object of the present invention is to provide a mold and a method for manufacturing the mold, each of which being capable of shortening a molding cycle by an efficient cooling of the melt resin passing through the sprue portion and being also capable of making formation and maintenance of the water tube easier.

Means for Solving the Problems

In order to achieve the above object, an embodiment of the present invention provides a mold including a movable side mold, a fixed side mold and a sprue bush, the sprue bush including a flow path for a cooling fluid of the fixed side mold, wherein inlet and outlet ports of the flow path for the cooling fluid are in a direct connection with a cooling tube, respectively, the cooling tube being located along a space portion provided in the fixed side mold, and wherein the space region is in a form of an opening provided in at least one of opposed surfaces of the fixed side mold.

In order to achieve the above object, an embodiment of the present invention provides a method for manufacturing a mold including a movable side mold, a fixed side mold and a sprue bush, the sprue bush including a flow path for a cooling fluid of the fixed side mold, the method including steps:

providing an opening in at least one of opposed surfaces of the fixed side mold, to provide the fixed side mold having a space portion therein; and locating a cooling tube along the space portion provided in the fixed side mold, to directly connect each of inlet and outlet ports of the flow path for the cooling fluid with the cooling tube.

Effect of the Invention

According to an embodiment of the present invention, at least one of the opposed surfaces of the fixed side mold has the opening therein. Thus, it is possible to directly connect each of the inlet and outlet ports of the flow path for the cooling fluid with the cooling tube. Thus, the temperature control of the cooling fluid can be performed accurately, and thus an efficient cooling of the melt resin passing through the sprue portion is possible. Accordingly, the present invention has an advantage in that the molding cycle can be shortened. In an embodiment of the present invention, at least one of the opposed surfaces of the fixed side mold has the opening therein. Thus, the opening allows a machining process for the surface of the fixed side mold to be easier performed. Thus, a degree of freedom of performing the machining process can be increased. Accordingly, the present invention has an advantage in that an easier maintenance of a space portion provided by the opening is possible.

MODES FOR CARRYING OUT THE INVENTION

Hereinafter, an injection mold 1 according to an embodiment of the present invention will be described.

Figure 1A:
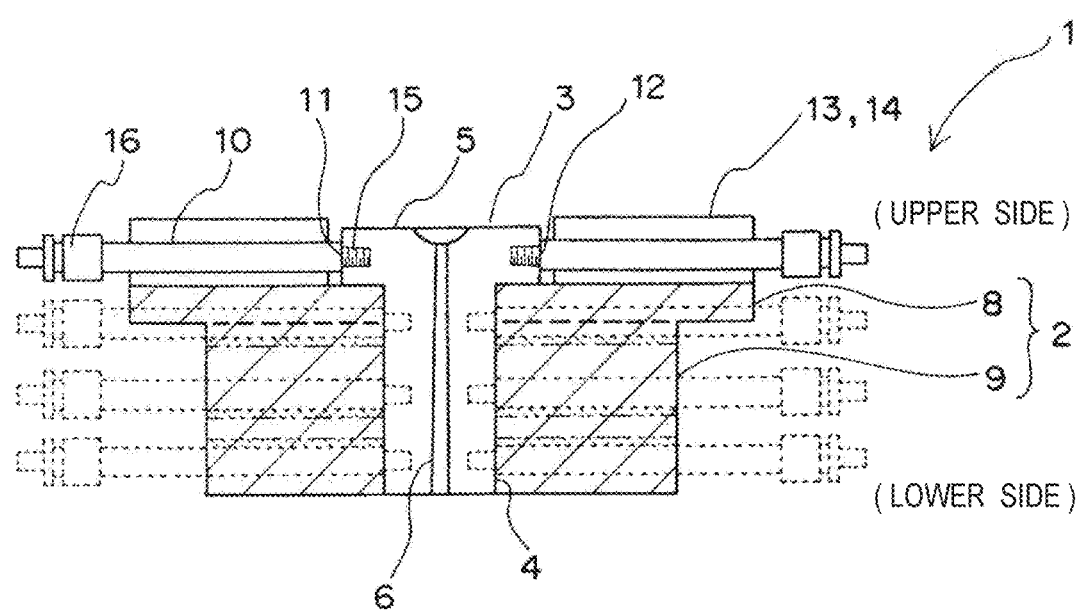
FIG. 1A is a partial cross-sectional view schematically showing an injection mold according to an embodiment of the present invention.
Figure 1B:
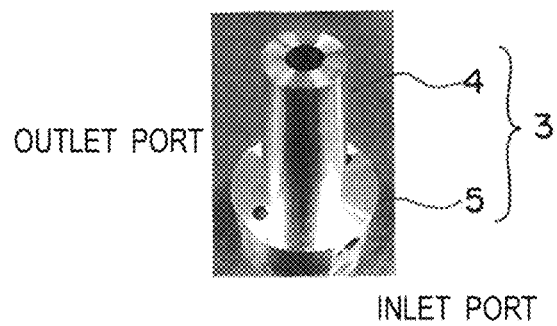
FIG. 1B is a photographic view of a sprue bush as a composition element of the injection mold according to an embodiment of the present invention.
Figure 1C:
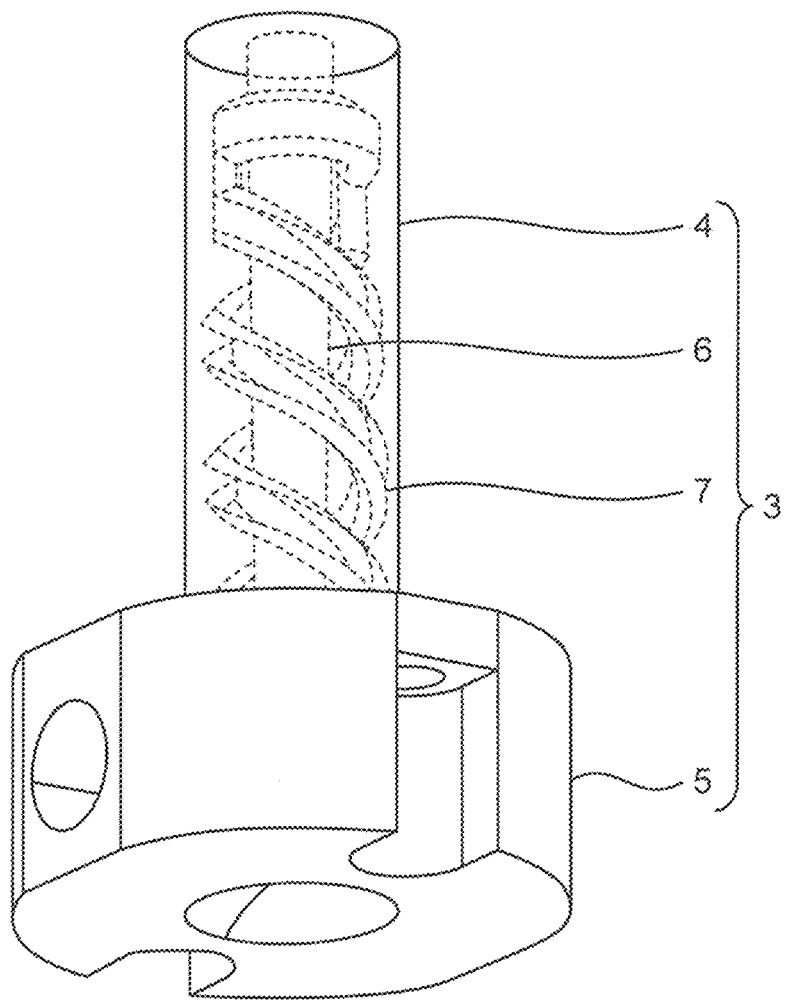
FIG. 1C is a perspective view schematically showing the sprue bush comprising a flow path for a cooling fluid therein.
Figure 2A:
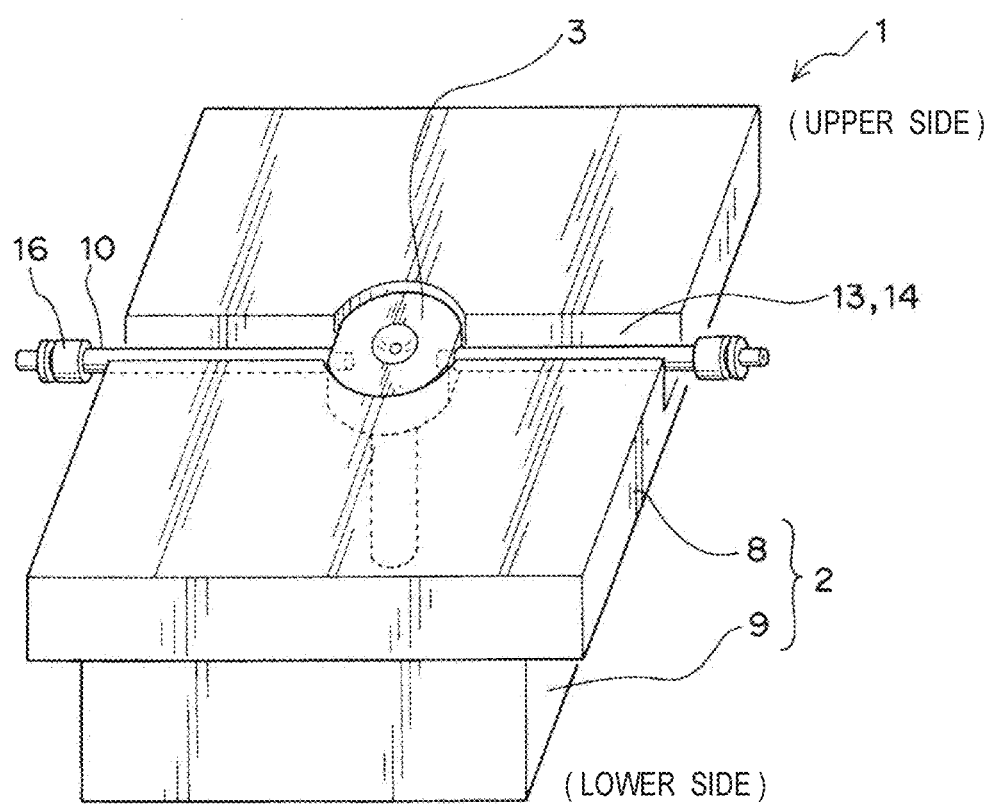
FIG. 2A is a partial perspective view schematically showing the injection mold according to an embodiment of the present invention.
Figure 2B:
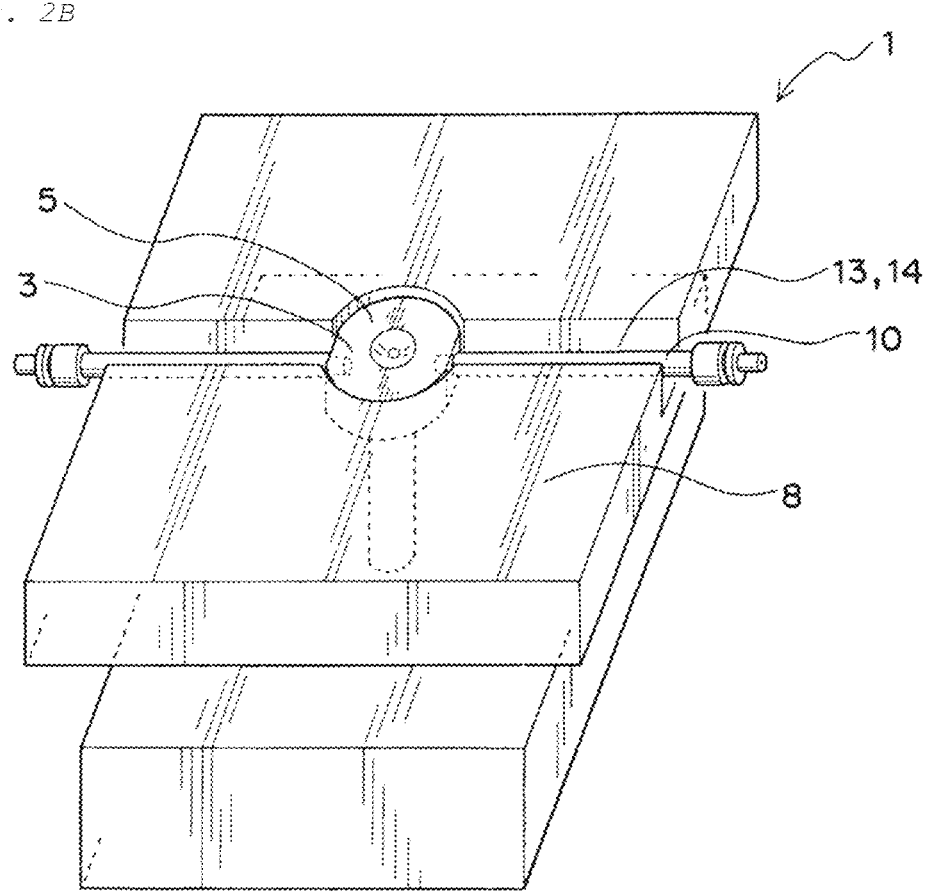
FIG. 2B is a partial perspective view schematically showing the injection mold according to an embodiment of the present invention, in a case that a mounting plate and a mold plate of a fixed side mold are spaced apart from each other.
Figure 10:
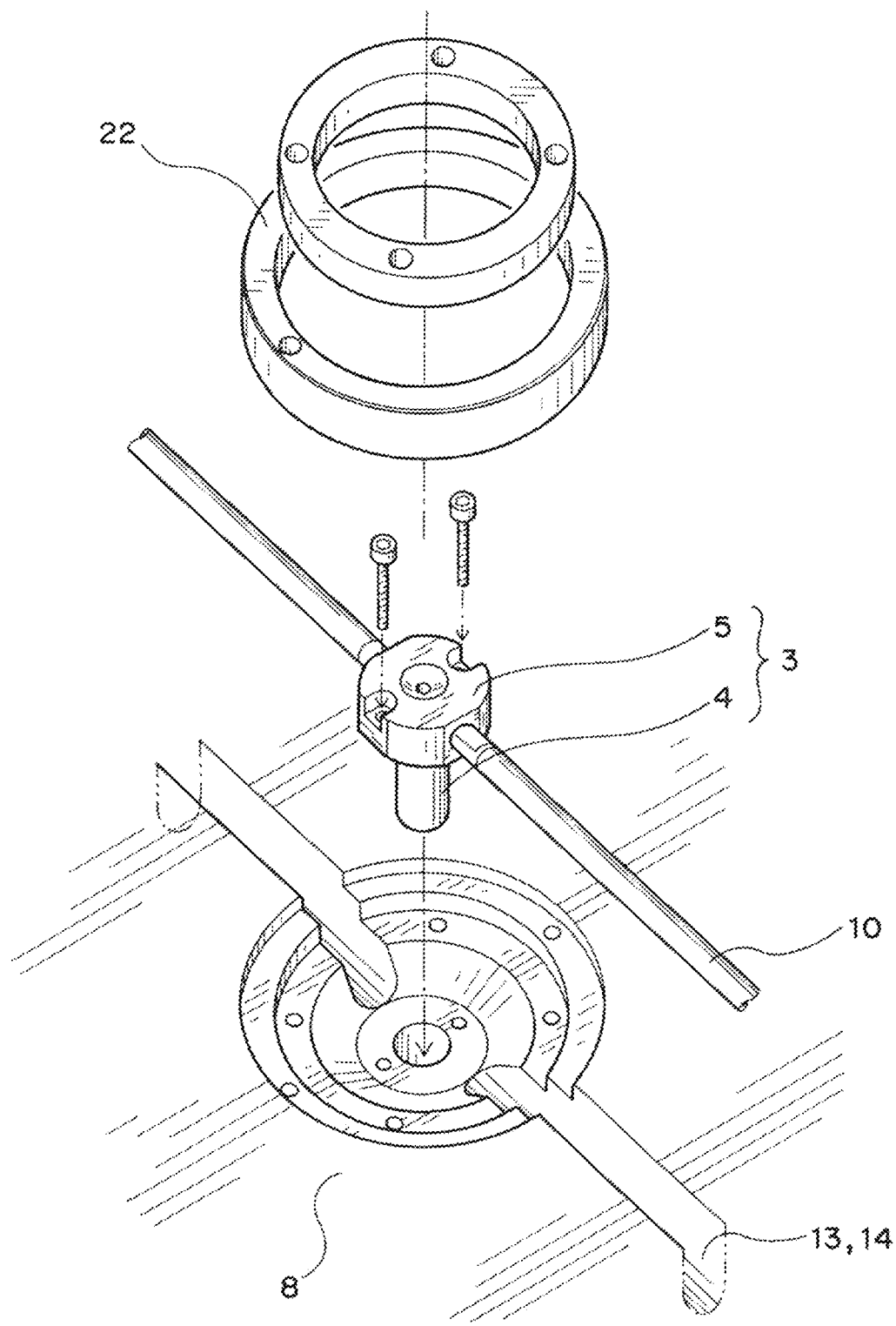
FIG. 10 is an exploded perspective view showing the injection mold according to an embodiment of the present invention.

FIG. 1, is a partial schematic sectional view of an injection mold 1 according to an embodiment of the present invention. The injection mold 1 according to an embodiment of the present invention comprises a fixed side mold 2 (or fixed side mold 2) and a sprue bush 3, the sprue bush 3 being provided in the fixed side mold 2. As shown in FIG. 1B, the sprue bush 3 is composed of a sprite bush-base portion 4 and a flange portion 5, the flange portion 5 being integrated with the sprue bush-base portion 4. The sprite bush 3 comprises a sprue portion 6 and a flow path for a cooling fluid therein, the sprue portion 6 being provided for injecting a melt resin into a cavity, the cavity being formed by a contact of a movable side mold with the fixed side mold 2. As shown in FIG. 1C, the flow path for the cooling fluid is provided to surround a periphery of the sprue portion 6. The fixed side mold 2 comprises a mold plate 9 and a mounting plate 8 for the mold plate 9. Furthermore, the injection mold 1 according to an embodiment of the present invention comprises cooling tubes 10 for passing through a cooling water, each of the cooling tubes 10 being in a direct connection with a side surface (or a lateral surface) of the flange portion 5 of the sprue bush 3 via a joint part 15, specifically via a female screw or a female thread. The joint part 15 is not limited to the female screw, and the joint part 15 may be a male screw or a cooling joint 16. Specifically, the cooling tubes 10 are each in a direct connection with each of an inlet port 11 and an outlet port 12 for the flow path for the cooling fluid, the inlet and outlet ports 11, 12 being exposed on each of both side surfaces (or lateral surfaces) of the flange portion 5 respectively. More specically, the inlet and outlet ports 11, 12 of the flow path for the cooling fluid are each located at each of both side surfaces of the sprue bush 3 such that the inlet and outlet ports 11, 12 are opposite to each other. Also, as shown in FIG. 1A, with regard to a space portion 14 provided in the injection mold 1, it is preferable that the space portion 14 extends in a direction perpendicular to a direction in which the sprue portion 6 extends, the sprue portion 6 being one of composition elements of the sprue bush 3. As shown in FIG. 2A, an upper portion of the mounting plate 8 in the fixed side mold has a channel 13, the channel 13 having the cooling tubes 10 provided along the channel 13 therein. In the specification of the present application, an injection port side of the sprue bush 3 corresponds to a side at which the mold plate 9 of the fixed side mold is located. Specifically, the injection port side of the sprue bush 3 corresponds to a "lower" side of the fixed side mold 2. A side opposite to the injection port side of the sprue bush 3 corresponds to a side at which the mounting plate 8 of the fixed side mold is located. Specifically, the side opposite to the injection port side of the sprue bush 3 corresponds to an "upper" side of the fixed side mold 2. Namely, the cooling tubes 10 are each located along the space portion 14 which is in a form of an opening provided in a part of an upper surface of the fixed side mold. As shown in FIG. 2B, subsequent to a provision of the cooling tube 10 along the channel 13 provided in the upper portion of the mounting plate 8 of the fixed side mold 2, a connection of the mounting plate 8 with the mold plate 9 of the fixed side mold 2 is performed. As shown in FIG. 10, the cooling; tubes 10 connected to both side surfaces of the flange portion 5 of the sprue bush 3 and the sprue bush 3 are provided along the channel 13, the channel 13 being provided in the upper side portion of the mounting plate 8. Subsequently, the sprue bush 3 and the cooling tubes 10 connected to both side surfaces of the flange portion 5 of the sprue bush 3 are fixed by a locating ring 22, each of the sprue bush 3 and the cooling tubes 10 being located along the channel 13. Accordingly, the injection mold 1 according to an embodiment of the present invention can be obtained.

The cooling tubes 10 are each in the direct connection with the inlet and outlet ports 11, 12 of the flow path for the cooling fluid, and thus a more accurately control of a temperature of the cooling fluid is possible. Thus, an efficient cooling of the melt resin passing through an inside of the sprue portion 6 is possible, and thus the molding cycle can be shortened. Therefore, a production efficiency of the molded article to be obtained can be improved. Additionally, the cooling tubes 10 are provided along the space portion 14 provided in the upper side portion of the mounting plate 8 of the fixed side mold 2. Thus, a visual checking of the cooling tubes 10 from an outside is possible. Therefore, the visual checking of the cooling allows a machining process for the surface of the mounting plate 8, i.e., the fixed side mold 2 to be easier performed. Thus, a degree of freedom of performing the machining process can be increased. Namely, an easier access to the cooling tubes 10 is possible. Accordingly, the present invention has an advantage in that an easier maintenance of a space portion 14 is possible.

The cooling tubes 10 as described above have technical features that (1) the cooling tubes 10 are each in the direct connection with each of the inlet and outlet ports 11, 12 of the flow path for the cooling fluid, and (2) the cooling tubes 10 are each provided along the space portion 14, the space portion being provided in the upper portion of the mounting plate 8 of the fixed side mold 2. However, the injection mold 1 according to an embodiment of the present invention is not limited to the above embodiment. For example, as shown in dashed lines in FIG. 1A, the cooling tubes 10 can be located in an upper side portion or a lower side portion of the mounting plate 8 of the fixed side mold 2, and/or can be located along an upper side portion or a lower side portion of the mold plate 9 of the fixed side mold 2.

In light of the above matters, the injection mold 1 according to another embodiment of the present invention will be described hereinafter.

Figure 3A:
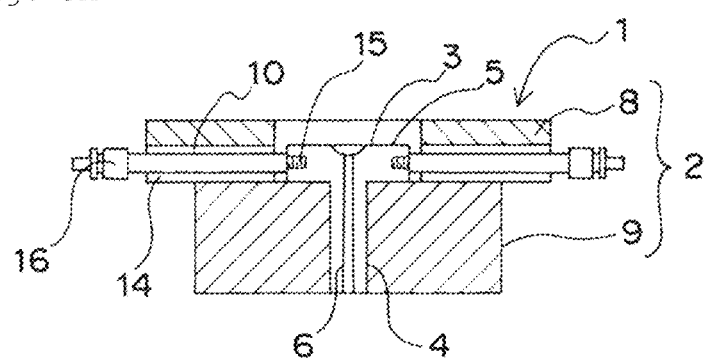
FIG. 3A is a partial cross-sectional view schematically showing the injection mold according to an embodiment of the present invention, in a case that a space portion is provided in a lower portion of the mounting plate of the fixed side mold.
Figure 3B:
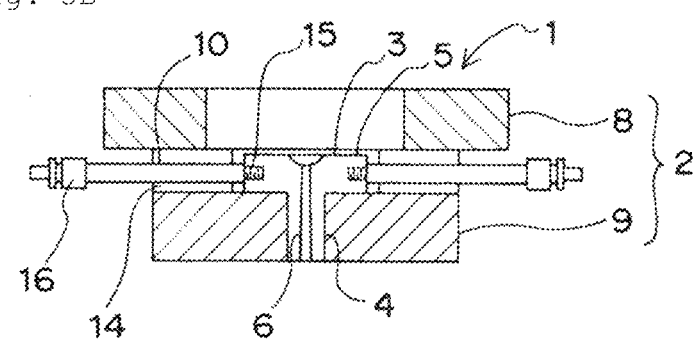
FIG. 3B is a partial cross-sectional view schematically showing the injection mold according to an embodiment of the present invention, in a case that the space portion is provided in an upper portion of the mold plate of the fixed side mold.
Figure 3C:
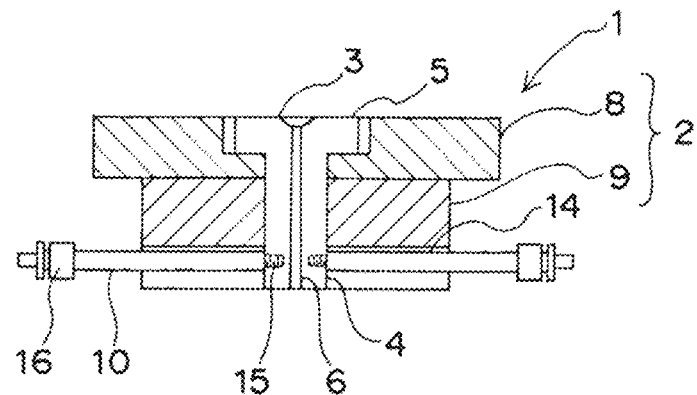
FIG. 3C is a partial cross-sectional view schematically showing the injection mold according to an embodiment of the present invention, in a case that the space portion is provided in a lower portion of the mold plate of the fixed side mold.
Figure 3D:
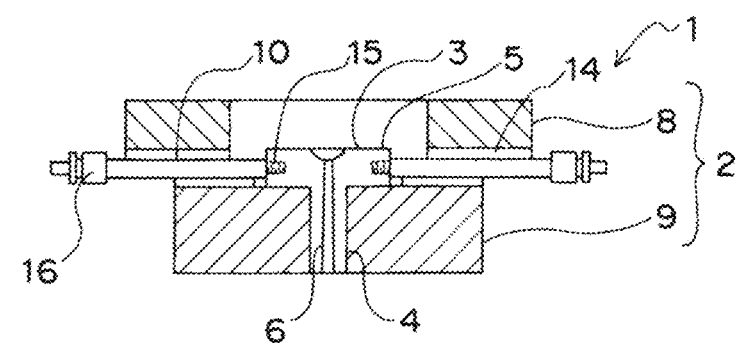
FIG. 3D is a partial cross-sectional view schematically showing the injection mold according to an embodiment of the present invention, in a case that the space portion is provided between a part of a lower portion of the mounting plate and a part of an upper portion of the mold plate of the fixed side mold.
Figure 3E:
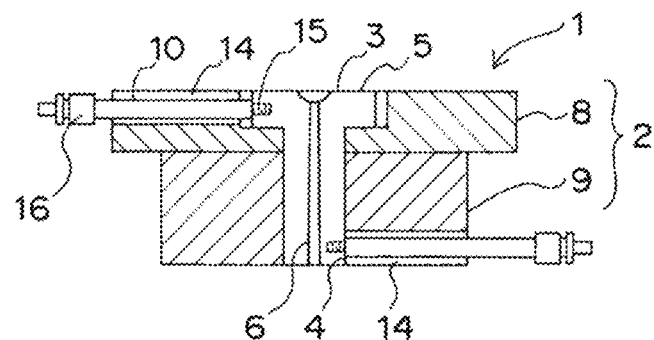
FIG. 3E is a partial cross-sectional view schematically showing the injection mold according to an embodiment of the present invention, in a case that the upper portion of the mounting plate of the fixed side mold has the space portion for locating a cooling tube on a supply side of a cooling fluid therein, and also the lower portion of the mold plate of the fixed side mold has the space portion for locating the cooling tube on a discharge side of the cooling fluid therein.

Firstly, the space portion 14 may be provided in the lower side portion of the mounting plate 8 of the fixed side mold as shown in FIG. 3A. The space portion 14 may be also provided in the upper side portion of the mold plate 9 of the fixed side mold 2 as shown in FIG. 3B. The space portion 14 may be provided in the lower side port oil the mold plate 9 of the fixed side mold 2 as shown in FIG. 3C. The space portion 14 may be provided between a part of the lower side portion of the mounting plate 8 of the fixed side mold 2 and a part of the upper side portion of the mold plate 9 of the fixed side mold 2 as shown in FIG. 3D. This means that the space portion 14 is not necessarily provided in a part of one member, and the space portion 14 may be provided in at least two members. Additionally, it is not necessary that the one of the space portions 14 in which the cooling tube 10 on a supply side of the cooling fluid is provided and the other of the space portions 14 in which the cooling tube 10 on a discharge side of the cooling fluid is provided are flush with each other. For example, as shown in FIG. 3E, the upper side portion of the mounting plate 8 of the fixed side mold 2 has the one of the space portions 14 for locating the cooling tube 10 on the supply side therein, and the lower side portion of the mold plate 9 of the fixed side mold 2 has the other of the space portions 14 for locating the cooling tube 10 on the discharge side therein, as shown in FIG. 3E. Reversely, the lower side portion of the mold plate 9 may have the one of the space portions 14 for locating the cooling tube 10 on the supply side therein, and the upper side portion of the mounting plate 8 may have the other of the space portions 14 for locating the cooling tube 10 on the discharge side therein.

Furthermore, the space portion 14 can be freely defined by a milling process. Thus, it is possible to provide the space portion 14 in a form of a non-linear extension. Therefore, as the cooling tube 10 to be provided along the space portion 14, a flexible part, e.g., a flexible hose can be used. Thus, the use of the flexible part allows a contact of the cooling tube 10 with an interference portion of the mold base to be avoided. Additionally, the use of the flexible part allows a freedom degree of an arrangement of cooling tube 10 to be increased.

In light of the above matters, the injection mold 1 according to a further another embodiment of the present invention will be described hereinafter.

Figure 4A:
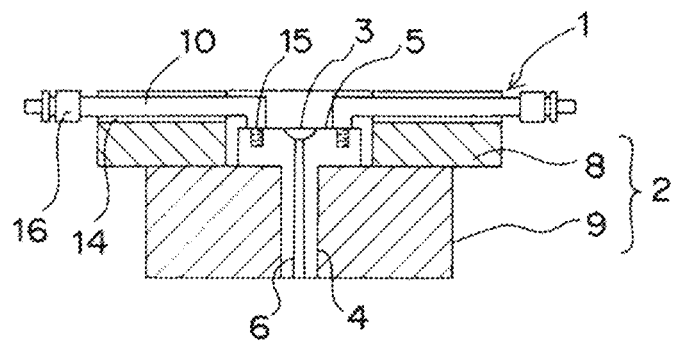
FIG. 4A is a partial cross-sectional view schematically showing the injection mold according to an embodiment of the present invention, in a case that the cooling tubes are each in a direct connection with each of inlet and outlet ports of the flow path for the cooling fluid, the inlet and outlet ports being exposed on a main surface of a flame portion.
Figure 4B:
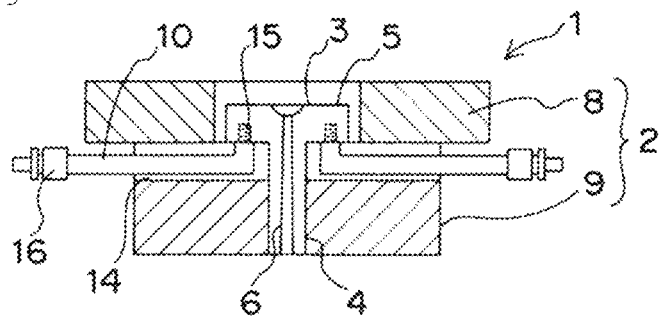
FIG. 4B is a partial cross-sectional view schematically showing the injection mold according to an embodiment of the present invention, in a case that the cooling tubes are each in a direct connection with each of inlet and outlet ports of the flow path for the cooling fluid, the inlet and outlet ports being exposed on a surface opposite to the main surface of the flange portion.
Figure 4C:
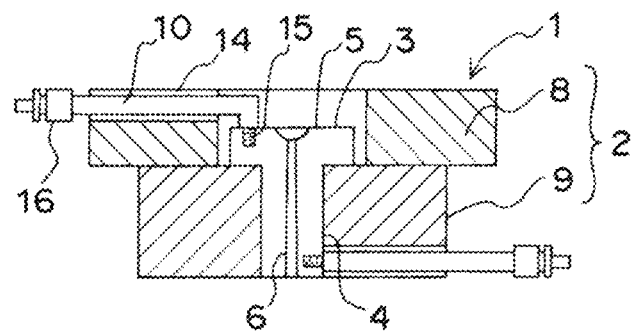
FIG. 4C is a partial cross-sectional view schematically showing the injection mold according to an embodiment of the present invention, in a case that the cooling tube on the supply side of the cooling fluid is in a direct connection with the inlet port of the flow path for the cooling fluid, the inlet port being exposed on the main surface of the flange portion, and also the cooling tube on the discharge side of the cooling fluid is in a direct connection with the outlet port of the flow path for the cooling fluid, the outlet port being exposed on the side surface of the base portion of the sprue bush.
Figure 4D:
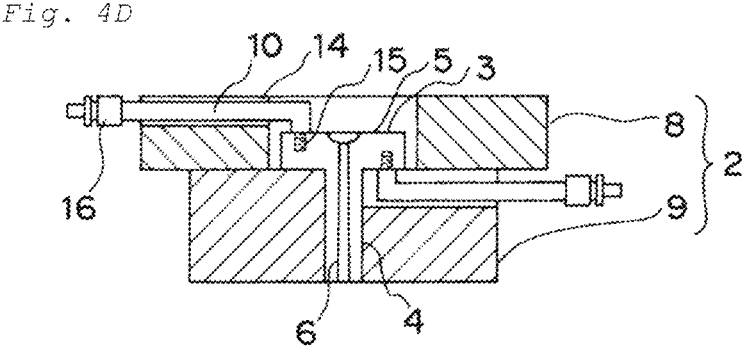
FIG. 4D is a partial cross-sectional view schematically showing the injection mold according to an embodiment of the present invention, in a case that the cooling tube on the supply side of the cooling fluid is in a direct connection with the inlet port of the flow path for the cooling fluid, the inlet port being exposed on the main surface of the flange portion, and also the cooling tube on the discharge side of the cooling fluid is in a direct connection with the outlet port of the flow path for the cooling fluid, the outlet port being exposed on the surface opposite to the main surface of the flange portion.
Figure 4E:
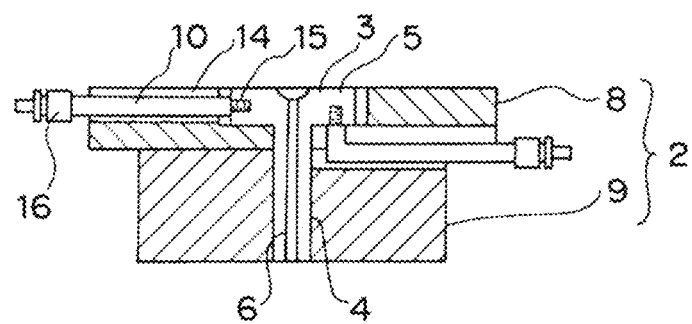
FIG. 4E is a partial cross-sectional view schematically showing the injection mold according to an embodiment of the present invention, in a case that the cooling tube on the supply side of the cooling fluid is in a direct connection with the inlet port exposed on the side surface of the flange portion, and also the cooling tube on the discharge side of the cooling fluid is in a direct connection with the outlet port exposed on the surface opposite to the main surface of the flange portion.

Firstly, as shown in FIG. 4A, the cooling tubes 10 may be each in a direct connection with each of the inlet and outlet ports of the flow path for the cooling fluid, the inlet and outlet ports shown in FIG. 4A being exposed on a main surface or an upper surface of the flange portion 5. This leads to a provision of the cooling tube 10 having a non-linear shape, not a straight shape. As shown in FIG. 4B, the cooling tubes 10 may be each in a direct connection with each of the inlet and outlet ports of the flow path for the cooling fluid, the inlet and outlet ports shown in FIG. 4B being exposed on a surface opposite to the main surface of the flange portion 5. As shown in FIG. 4C, the cooling tube 10 on the supply side of the cooling fluid may be in a direct connection with the inlet port 11 of the flow path for the cooling fluid, the inlet port shown in FIG. 4C being exposed on the main surface of the flange portion 5. The cooling tube 10 on the discharge side of the cooling fluid may be in a direct connection with the outlet port 12 of the flow path for the cooling fluid, the outlet port shown in FIG. 4C being exposed on the side surface of the base portion 4 of the sprue bush 3. Reversely, the cooling tube 10 on the supply side of the cooling fluid may be in a direct connection with the inlet port 11 exposed on the side surface of the base portion 4 of the sprue bush 3. The cooling tube 10 on the discharge side of the cooling fluid may be in a direct connection with the outlet port 12 exposed on the main surface of the flange portion 5. As shown in FIG. 4D, the cooling tube 10 on the supply side of the cooling fluid may be in a direct connection with the inlet port 11 of the flow path for the cooling fluid, the inlet port shown in FIG. 4D being exposed on the main surface of the flange portion 5. The cooling tube 10 on the discharge side of the cooling fluid may be in a direct connection with the outlet port 12 of the flow path for the cooling fluid, the outlet port shown in FIG. 4D being exposed on the surface opposite to the main surface of the flange portion 5. Reversely, the cooling tube 10 on the supply side of the cooling fluid may be in a direct connection with the inlet port 12 exposed on the surface opposite to the main surface of the flange portion 5. The cooling tube 10 on the discharge side of the cooling fluid may be in a direct connection with the outlet port 12 exposed on the main surface of the flange portion 5. As shown in FIG. 4E, the cooling tube 10 on the supply side of the cooling fluid may be in a direct connection with the inlet port 11 exposed on the side surface of the flange portion 5. The cooling tube 10 on the discharge side of the cooling fluid may be in a direct connection with the outlet port 12 exposed on the surface opposite to the main surface of the flange portion 5. Reversely, the cooling tube 10 on the supply side of the cooling fluid may be in a direct connection with the inlet port 11 exposed on the surface opposite to the main surface of the flange portion 5. The cooling tube 10 on the discharge side of the cooling fluid may be in a direct connection with the outlet port 12 exposed on the side surface of the flange portion 5.

It is preferable that the space portion 14 reaches to a vicinity of a material injection portion of the sprue bush 3. Thus, it is possible to quickly solidify the melt resin in the vicinity of the material injection port of the sprue bush 3, which allows the timing of performing the mold opening to be made earlier. Therefore, a further shortening of the molding time is possible, and thus the production efficiency of the molded article to be obtained can be further improved.

Figure 5A:
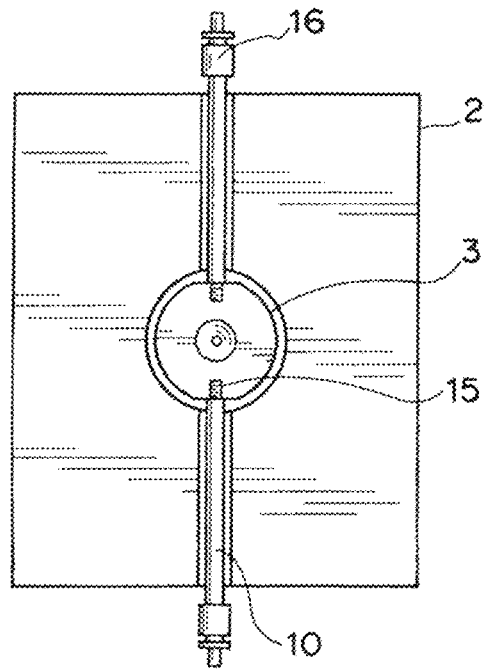
FIG. 5A is a top plan view schematically showing the injection mold according to an embodiment of the present invention, in a case that each of the inlet and outlet ports of the flow path for the cooling fluid is located at each of both side surfaces of the sprue bush such that the inlet and outlet ports are opposite to each other.
Figure 5B:
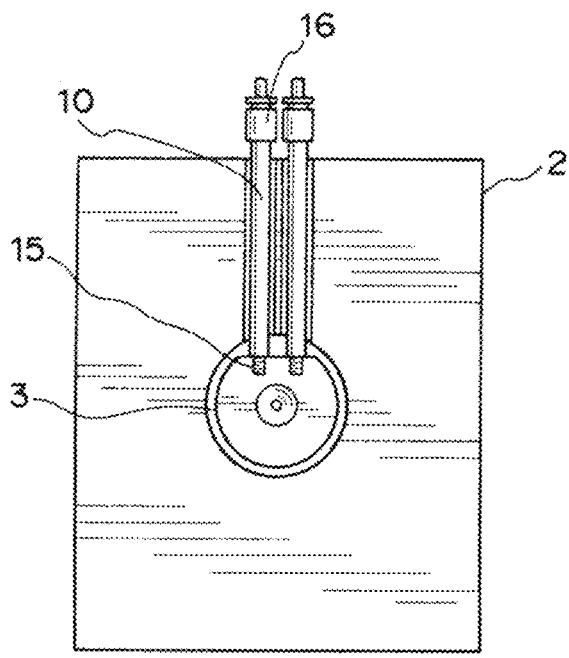
FIG. 5B is a top plan view schematically showing the injection mold according to an embodiment of the present invention, in a case that the inlet and outlet ports of the flow path for the cooling fluid are both located at one of side surfaces of the sprue bush.
Figure 5C:
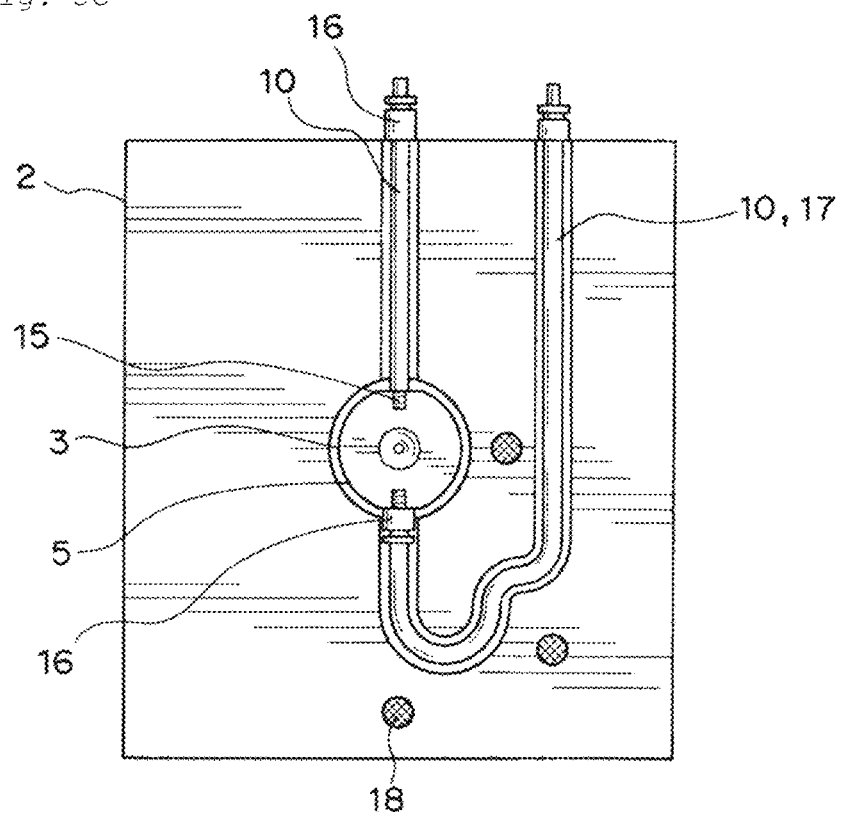
FIG. 5C is a top plan view schematically showing the injection mold according to an embodiment of the present invention, in a case that a flexible hose is used as the cooling tube on the suction side or the discharge side of the cooling fluid, the cooling tube being provided along the space portion.

Furthermore, each of the inlet and outlet ports 11, 12 of the flow path for the cooling fluid is not necessarily located at each of both side surfaces of the sprue bush 3 such that the inlet and outlet ports 11, 12 are opposite to each other, as shown in FIG. 5A. This means that the inlet and outlet ports 11, 12 of the flow path for the cooling fluid may be provided at arbitrary positions on the side surface of the sprue bush 3. For example, as shown in FIG. 5B, the inlet and outlet ports 11, 12 of the flow path for the cooling fluid may be both located at one of the side surfaces of the sprue bush 3. As a result, it is possible to make a dimension of the injection mold 1 of the present invention smaller. Further, as described above, the space portion 14 can be freely defined by performing the milling process, and thus it is possible to provide the space portion 14 in the form of the non-linear extension. Therefore, as shown in FIG. 5C, a flexible hose 17 can be used as the cooling tube 10 on the suction side or the discharge side of the cooling fluid, the cooling tube 10 being provided along the space portion 14. The use of the flexible hose 17 allows the contact of the cooling tube 10 with the interference portion 18 of the mold base to be avoided. The flexible hoses 17 may be used respectively for both of the cooling tubes 10 on the suction side and the discharge side of the cooling fluid, each of the cooling tubes 10 being provided along the space portion 14.

Figure 6A:
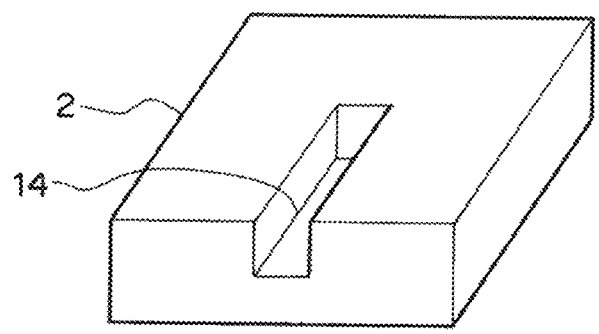
FIG. 6A is a perspective view schematically showing the fixed side mold having an opening in a part of its surface.
Figure 6B:
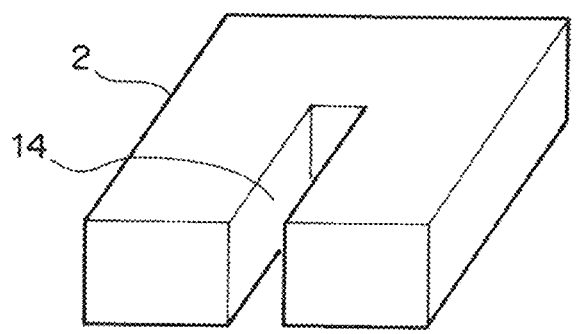
FIG. 6B is a perspective view schematically showing the fixed side mold having a continuous opening extending from the one of opposed surfaces to the other thereof.
Figure 6C:
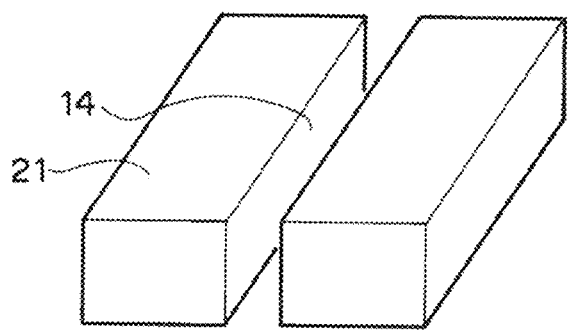
FIG. 6C is a perspective view schematically showing that the space portion is in a form of a gap provided between two sub-molds, each of the two sub-molds serving as a composition element of the fixed side mold.
Figure 6D:
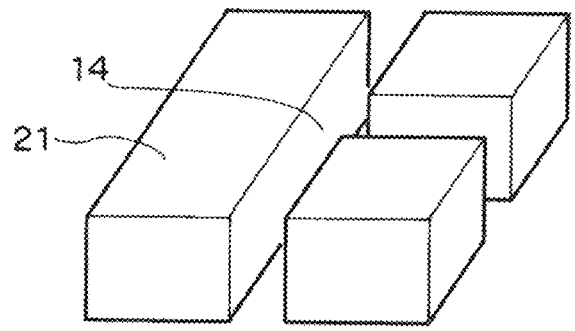
FIG. 6D is a perspective view schematically showing that the space portion is in a form of the gap provided among three sub-molds, each of the three sub-molds serving as a composition element of the fixed side mold.
Figure 7:
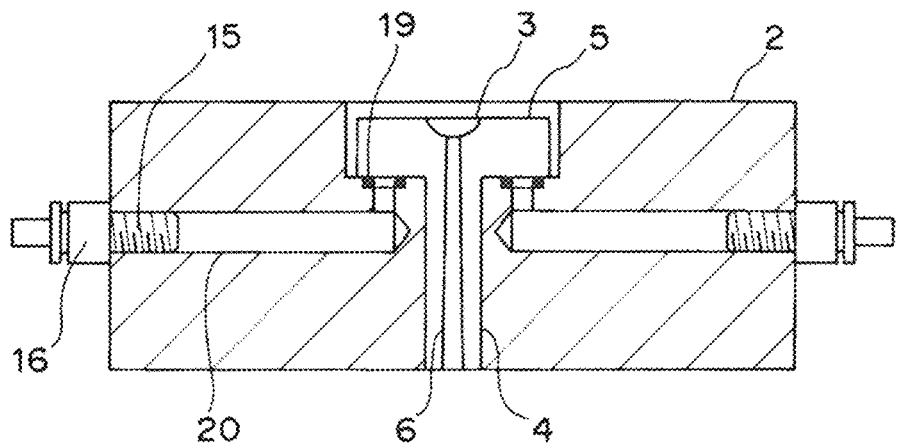
FIG. 7 is a partial sectional view schematically showing a conventional injection mold.

Furthermore, as shown in FIG. 6A, the space portion 14 described above is in a form of an opening provided in a part of a surface of the fixed side mold 2 such as the mounting plate 8 or the mold plate 9 of the fixed side mold 2. However, the space portion 14 is not limited to this embodiment. As shown in FIG. 6B, the space portion 14 may be in a form of a continuous opening, the continuous opening extending from the one of opposed surfaces of the fixed side mold 2 to the other thereof. As shown in FIG. 6C, the space portion 14 may be in a form of a gap provided between two sub-molds 21, each of the two sub-molds 21 serving as a composition element of the fixed side mold 2. Furthermore, the space portion 14 may be in the form of the gap provided among three sub-molds 21, each of the three sub-molds 21 serving as a composition element of the fixed side mold 2. Needless to say, the space portion 14 may be in the form of the gap provided among four or more sub-molds 21, each of the four or more sub-molds 21 serving as a composition element of the fixed side mold 2.

EXAMPLES

Example 1

Figure 8A:
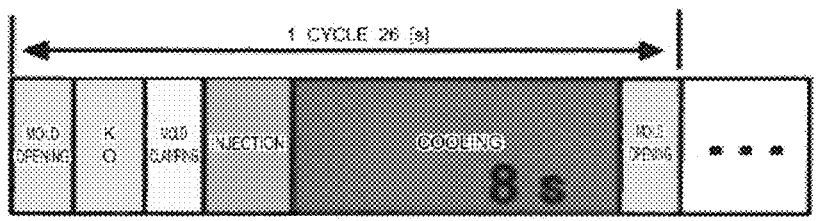
FIG. 8A is a molding cycle diagram for obtaining a molded article in a condition of a use of the injection mold according to an embodiment of the present invention.
Figure 8B:
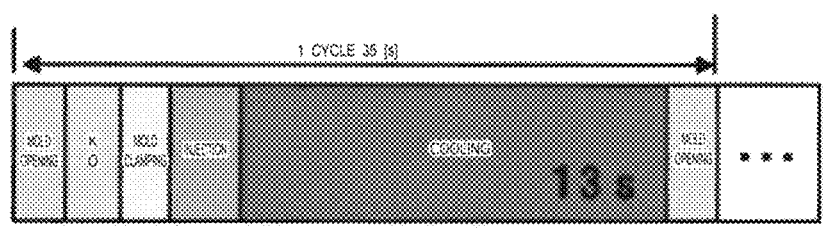
FIG. 8B is a molding cycle diagram for obtaining a molded article in a condition of a use of a conventional injection mold.

Under the following conditions, a molded article was obtained.
Resin material: PPWW 567 w 3952
Mold: (dimension) 300 mm×500 mm×345 mm/(mass) 403 kg
Molding machine: Nissei ES 2000
As shown in FIGS. 8A and 8B, in the injection mold 1 according to an embodiment of the present invention, the cooling time of the melt resin could be shortened from 13 s to 8 s compared with a conventional mass-production mold. As a result, it was possible to make a shortening rate of the molding cycle 25.7% as a whole (35 s→26 s).

Figure 8C:
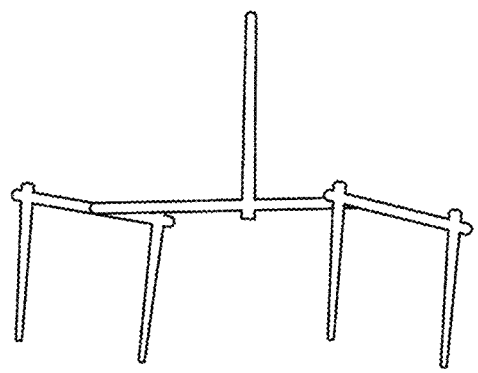
FIG. 8C is a photographic view of a sprue runner portion obtained by the injection mold according to an embodiment of the present invention.
Figure 8D:
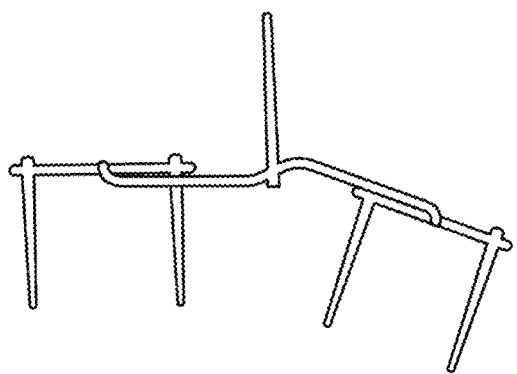
FIG. 8D is a photographic view of a sprue runner portion obtained by a conventional injection mold.

In a case of using the injection mold 1 according to an embodiment of the present invention, a sufficient cooling of the melt resin could be performed by an appropriate control of the cooling temperature of the melt resin as shown in the photograph of FIG. 8C. Therefore, a sprue runner part had a good state. On the other hand, in a case of using a conventional mass-production mold, the cooling of the melt resin was insufficient by an inappropriate control of the cooling temperature of the melt resin as shown in FIG. 8D. As a result, a sprue runner part broke, which made a continuous molding impossible.

Example 2

Figure 9A:
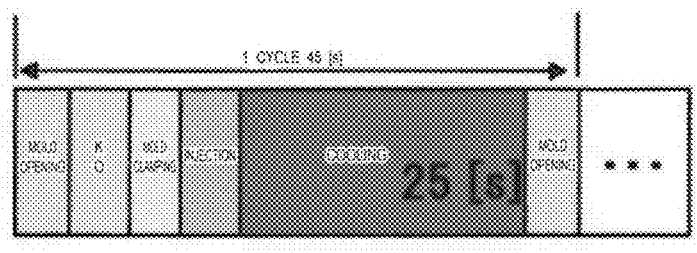
FIG. 9A is a molding cycle diagram for obtaining a molded article in the condition of the use of the injection mold according to an embodiment of the present invention.
Figure 9B:
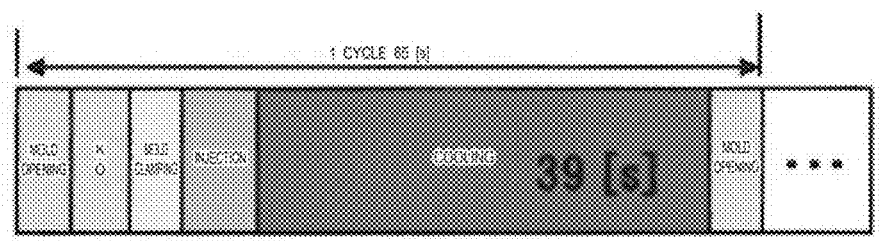
FIG. 9B is a molding cycle diagram for obtaining a molded article in the condition of the use of the conventional injection mold.

As shown in FIGS. 9A and 9B, in the injection mold 1 according to an embodiment of the present invention, the cooling time of the melt resin could be shortened from 39 s to 25 s compared with the conventional mass-production mold. As a result, it was possible to make the shortening rate of the molding cycle 30.8% as a whole (65 s→45 s).

Figure 9C:
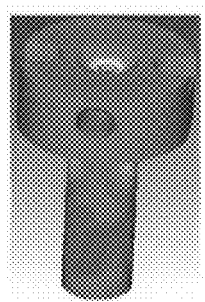
FIG. 9C is a perspective view schematically showing a temperature distribution area of the sprue bush.

In the case of using the injection mold 1 according to an embodiment of the present invention, the sufficient cooling of the melt resin could be performed by the appropriate control of the cooling temperature of the melt resin. Therefore, an elongation phenomenon of the sprue portion did not occur. As a result of a temperature analysis of the sprue bush 3 during the cooling process, as shown in FIG. 9C, it was found that the temperature in the vicinity of the material injection port of the sprue bush was sufficiently cooled, compared with that of another portion of the sprue bush other than the vicinity of the material injection port. On the other hand, in the case of using the conventional mass-production mold, the cooling of the melt resin was insufficient by the inappropriate control of the cooling temperature of the melt resin. Thus, the elongation phenomenon of the sprue portion occurred. As a result, due to the sprue portion in a state of the elongation, it contacted with the injection mold upon the mold opening, which made a continuous molding impossible.

It should be noted that the present invention as described above includes the following aspects:
The first aspect: A mold comprising a movable side mold, a fixed side mold and a sprue bush, the sprue bush comprising a flow path for a cooling fluid of the fixed side mold,
wherein inlet and outlet ports of the flow path for the cooling fluid are in a direct connection with a cooling tube, respectively, the cooling tube being located along a space portion provided in the fixed side mold, and
wherein the space region is in a form of an opening provided in at least one of opposed surfaces of the fixed side mold.
The second aspect: The mold according to the first aspect, wherein the space portion is in a form of a channel, the channel being provided in a surface of the fixed side mold.
The third aspect: The mold according to the first aspect, wherein the space portion is in a form of a continuous opening, the continuous opening extending from the one of the opposed surfaces of the fixed side mold to the other thereof.
The fourth aspect: The mold according to the third aspect, wherein the fixed side mold is composed of at least two sub-molds, and
wherein the space portion is in a form of a gap provided between the at least two sub-molds.
The fifth aspect: The mold according to any one of the first to fourth aspects, wherein the fixed side mold is composed of a mold plate and a mounting plate for the mold plate, and
wherein the space portion is provided in at least one of upper or (and) lower surfaces of the mounting plate, and/or at least one of upper or (and) lower surfaces of the mold plate.
The sixth aspect: The mold according to any one of the first to fifth aspects, wherein the inlet and outlet ports of the flow path for the cooling fluid are located at arbitrary positions on a side surface of the sprue bush.
The seventh aspect: The mold according to the sixth aspect, wherein the inlet and outlet ports of the flow path for the cooling fluid are each located at each of both side surfaces of the sprue bush such that the inlet and outlet ports are opposite to each other.
The eighth aspect: The mold according to the sixth aspect, wherein the inlet and outlet ports of the flow path for the cooling fluid are both located at one of the side surfaces of the sprue bush.
The ninth aspect: The mold according to any one of the first to eighth aspects, wherein the cooling tube has a flexibility.
The tenth aspect: The mold according to the ninth aspect, wherein the cooling tube is in a form of a flexible hose.
The eleventh aspect: The mold according to any one of the first to tenth aspects, wherein the space portion is in a form of a non-linear extension.
The twelfth aspect: The mold according to any one of the first to eleventh aspects, wherein the sprue bush comprises a sprue portion, and
wherein the space portion extends in a direction perpendicular to a direction in which the sprue portion extends.
The thirteenth aspect: The mold according to any one of the first to twelfth aspects, wherein the space portion reaches to a vicinity of a material injection portion of the sprue bush.
The fourteenth aspect: The mold according to any one of the first to thirteenth aspects, wherein the inlet and outlet ports of the flow path for the cooling fluid are in a direct connection with the cooling tube via a joint part, respectively, the joint part being composed of at least one selected from a group comprising a male screw, a female screw and a cooling joint.
The fifteenth aspect: A method for manufacturing a mold comprising a movable side mold, a fixed side mold and a sprue bush, the sprue bush comprising a flow path for a cooling fluid of the fixed side mold, the method comprising steps:

providing an opening in at least one of opposed surfaces of the fixed side mold, to provide the fixed side mold having a space portion therein; and locating a cooling tube along the space portion provided in the fixed side mold, to directly connect each of inlet and outlet ports of the flow path for the cooling fluid with the cooling tube.

The sixteenth aspect: The method according to the fifteenth aspect, wherein the space portion is provided such that the space portion has a configuration of a non-linear extension.

The seventeenth aspect: The method according to the fifteenth or sixteenth aspect, wherein a flexible hose is used as the cooling tube.

The eighteenth aspect: The method according to any one of the fifteenth to seventeenth aspects, wherein the space portion is provided such that the space portion has a channel configuration.

INDUSTRIAL APPLICABILITY

A mold according to an embodiment of the present invention can be used as an injection mold.

EXPLANATION OF REFERENCE NUMERALS

1 Mold for injection mold
2 Fixed side mold
3 Sprue bush
4 Base portion of sprue bush
5 Flange portion
6 Sprue portion
7 Flow path for cooling fluid
8 Mounting plate of fixed side mold
9 Mold plate of fixed side mold
10 Cooling tube
11 Inlet port of flow path for cooling fluid
12 Outlet port of flow path for cooling fluid
13 Channel
14 Space portion
15 Joint part
16 Cooling joint
17 Flexible hose
18 Interference portion of mold base
19 O-ring
20 Water tube
21 Sub-mold
22 Locating ring

The invention claimed is:

1. A mold, comprising:
a movable side mold;
a fixed side mold;
at least one flexible cooling tube among cooling tubes; and
a sprue bush comprising a flow path for a cooling fluid of the fixed side mold, and inlet and outlet ports of the flow path for the cooling fluid are in a direct connection with a corresponding one of the cooling tubes,
wherein the cooling tubes are located along a space portion provided in the fixed side mold,
wherein the space portion includes an opening provided in at least one of opposed surfaces of the fixed side mold,
wherein the space portion includes a region in a form of a non-linear extension, and
wherein the at least one flexible cooling tube is disposed along the region that is in the form of the non-linear extension.

2. The mold according to claim 1, wherein the space portion is in a form of a channel, the channel being provided in a surface of the fixed side mold.

3. The mold according to claim 1, wherein the space portion is in a form of a continuous opening, the continuous opening extending from the one of the opposed surfaces of the fixed side mold to the other thereof.

4. The mold according to claim 3, wherein the fixed side mold is composed of at least two sub-molds, and
wherein the space portion is in a form of a gap provided between the at least two sub-molds.

5. The mold according to claim 1, wherein the fixed side mold is composed of a mold plate and a mounting plate for the mold plate, and
wherein the space portion is provided in at least one of upper or lower surfaces of the mounting plate, and/or at least one of upper or lower surfaces of the mold plate.

6. The mold according to claim 1, wherein the inlet and outlet ports of the flow path for the cooling fluid are located at a side surface of the sprue bush.

7. The mold according to claim 6, wherein the inlet and outlet ports of the flow path for the cooling fluid are each located at each of both side surfaces of the sprue bush such that the inlet and outlet ports are opposite to each other.

8. The mold according to claim 6, wherein the inlet and outlet ports of the flow path for the cooling fluid are both located at one of the side surfaces of the sprue bush.

9. The mold according to claim 1, wherein the sprue bush comprises a sprue portion, and
wherein the space portion extends in a direction perpendicular to a direction in which the sprue portion extends.

10. The mold according to claim 1, wherein the space portion reaches to a vicinity of a material injection portion of the sprue bush.

11. The mold according to claim 1, wherein the inlet and outlet ports of the flow path for the cooling fluid are in a direct connection with the cooling tubes via a corresponding joint part, the corresponding joint part being composed of at least one selected from a group comprising a male screw, a female screw and a cooling joint.

12. The mold according to claim 1, wherein the at least one flexible cooling tube is in a form of a flexible hose.

13. A method for manufacturing a mold, the method comprising:
preparing a sprue bush comprising a flow path for a cooling fluid;
preparing a fixed side mold, and forming an opening in at least one of opposed surfaces of the fixed side mold;
preparing a movable side mold;
inserting the sprue bush into the fixed side mold;
providing cooling tubes, wherein at least one of the cooling tubes is provided as a flexible cooling tube;
forming the fixed side mold to have a space portion that includes a region in a form of a non-linear extension therein;
placing the cooling tubes along the space portion provided in the fixed side mold to directly connect each of inlet and outlet ports of the flow path for the cooling fluid with a corresponding one of the cooling tubes;
disposing the at least one cooling tube, which is provided as the flexible cooling tube, along the region that is in the form of the non-linear extension; and
contacting the fixed side mold with the movable side mold.

14. The method according to claim 13, wherein a flexible hose is used as the flexible cooling tube.

15. The method according to claim 13, wherein the space portion is provided such that the space portion has a channel configuration.

\* \* \* \* \*